Patented May 12, 1931

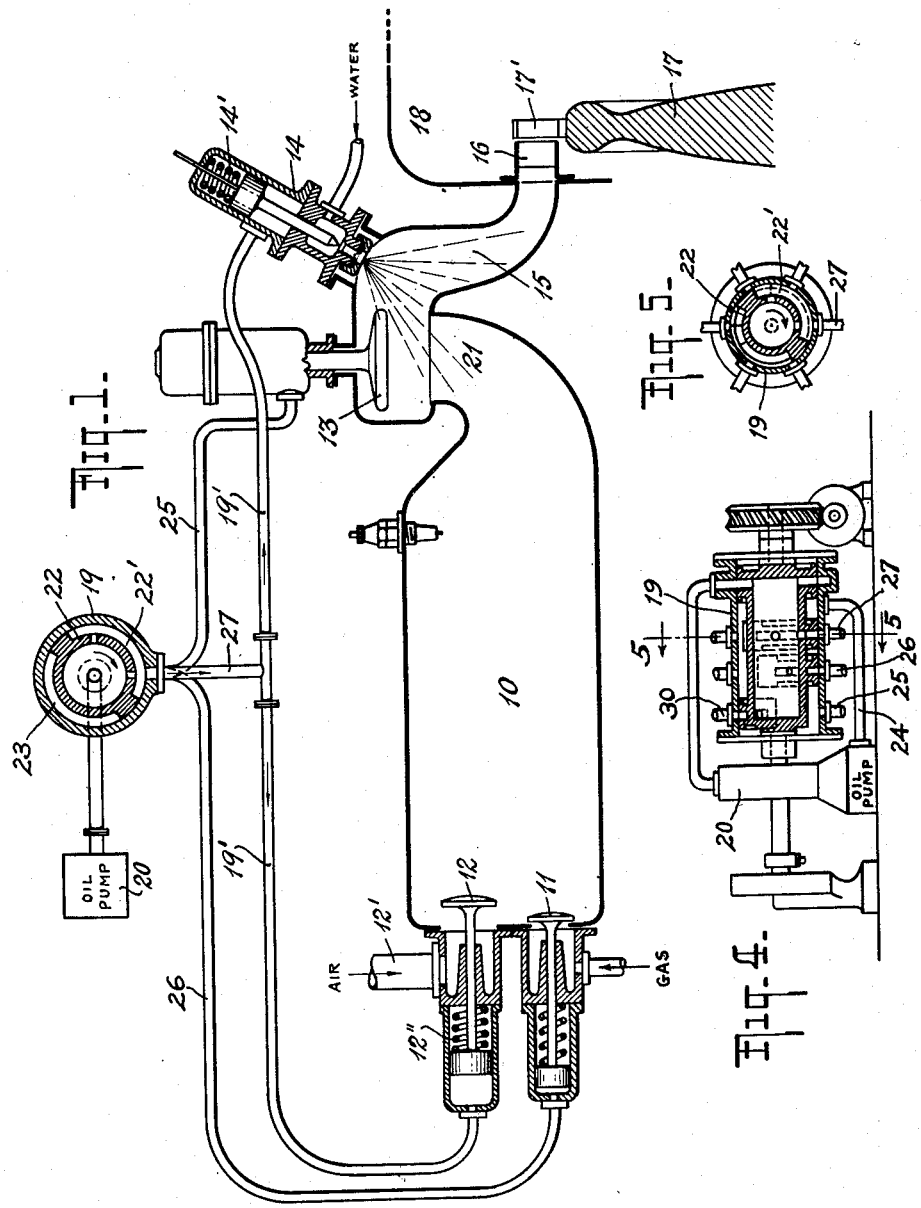

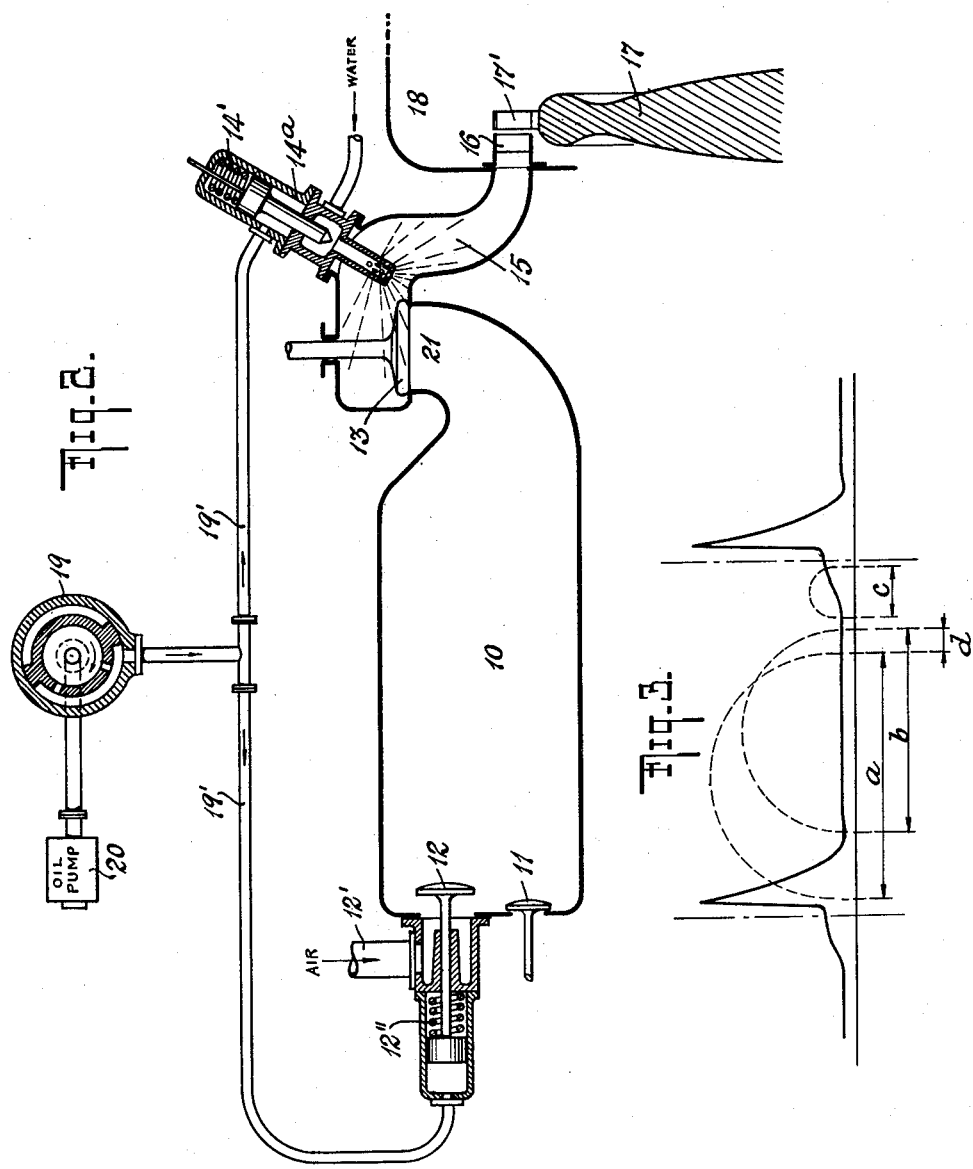

1,805,093

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

COOLING DEVICE FOR COMBUSTION GAS TURBINES

Application filed March 12, 1927. Serial No. 174,892.

My present invention relates to a device for injecting water into the scavenging air after the combustion gases have passed to the blades of the turbine rotor. The invention has been designed particularly for use in connection with a type of turbine developed by me and illustrated, for instance, in my pending application Serial No. 47,422. In turbines of this type, each of these combustion chambers is scavenged and cooled by passing air through it under a pressure equivalent to about 6 feet of water after the expansion of the combustion gases, such air also passing through the outlet port and the connection or channel leading from said port to the turbine nozzle as well as the nozzle itself. This blast of air cleans or scavenges the combustion chamber by expelling therefrom the combustion gases remaining from the preceding explosion or combustion and expansion, and at the same time cools those interior parts of the engine along with its streams.

I have found, in the practical use of turbines of this type, that the transfer of heat is relatively slight in the combustion chamber, but materially greater in the channel intervening between the outlet valve and the turbine nozzle. If, therefore, equilibrium is to be established between the amount of heat absorbed by the walls of the chamber and channel and the heat removed therefrom by the cooling agent, at temperatures not exceeding 400° C., a greater amount of air will be required for the cooling and scavenging of the channel between the valve-controlled outlet and the nozzle than is required for cooling and scavenging the combustion chamber itself. The amount of air passed through said channel can be increased either by augmenting the pressure while leaving the scavenging time unaltered, or if a constant pressure is desired, by prolonging the scavenging period. Either of these expedients, however, will reduce the output or efficiency of the combustion gas turbine.

My present invention avoids the difficulties and drawbacks mentioned above, by injecting a spray of water into the air streaming through the channel between the valve-controlled outlet of the combustion chamber and the turbine nozzle. By thus saturating or impregnating the air with water, the cooling action is increased considerably.

Two satisfactory and preferred embodiments of my invention are illustrated in somewhat diagrammatic fashion by the accompanying drawings, Figs. 1 and 2 of which are elevations, partly in section, through the axis of the turbine, the several valves and other movable parts being shown in the position they occupy at the time of injecting water into the air, Fig. 3 is a diagram illustrating certain features of the operation, Fig. 4 is an elevation of a distributor employed to operate the valves of a combustion chamber in proper sequence, and Fig. 5 is a section along the line 5—5 of Fig. 4.

At 10 I have indicated a combustion chamber of the type disclosed in my application above referred to, at 11 a valve controlling the admission of fuel, at 12 a valve controlling the admission of air supplied through a pipe 12', and at 13 the outlet valve, it being understood that the valves 11 and 13 as well as suitable ignition mechanism (not shown) are controlled from the turbine shaft in any well known or approved manner. When the valve 13 is open, the combustion gases will pass from the combustion chamber 10 into a channel 15 which leads to the nozzles 16, discharging the gases against the blades 17' of the turbine rotor 17 to actuate the turbine in the well known manner. At 18 I have indicated a portion of a chamber receiving the gases after their passage from the turbine blades.

When the valve 13 is open as in Fig. 1, and scavenging air is admitted through the open valve 12, the air streaming through the channel 15 will be met by a jet of water projected from a spraying device or injector 14 and thus the heat-absorbing capacity of the fluid streaming through the channel 15 will be increased very considerably and accordingly the cooling action exerted on the walls of the channel and on the nozzles 16 will be greatly improved. The valve or other device controlling this jet 14 is open only at such times as the scavenging air is passing through the channel 15. As long as combustion gases pass through said channel, and during the explosion, the jet is closed and water will at that time not be admixed to the combustion gases and thereby reduce their capacity for producing energy. In order that the jet 14 may be open only at the proper times as indicated above, I cause such jet or valve to be opened in synchronism with the scavenging air valve 12. This may be obtained in a very simple manner by supplying a medium under pressure, for instance oil, to the operating chambers of the valve 12 and the jet 14 from a distributor 19 common to, and connected with both, as by pipes 19', the oil under pressure being supplied to said distributor by an oil pump 20. Springs 12'' and 14' tend to close the valve 12 and the valve of the jet 14 in opposition to the pressure of the oil.

In the distributor (shown diagrammatically in section in Fig. 1 and in elevation in Fig. 4) there is mounted in a well-known manner, as shown in the patent to Holzwarth No. 877,194, dated January 21, 1908, a revolving hollow cylinder 22 whose interior is filled with oil under pressure by an oil pump 20. The pipes 19'—19' which are connected to the distributor are alternately placed in communication with the oil under pressure through the channel 22' and with the oil relief outlet 23, connected by pipe 24 to the suction side of the pump. In the first case, the pistons of valves 12 and 14 are so shifted that the valves 12 and 14 are opened, so that scavenging air flows through the chamber and the channel 15 and water is sprayed into said scavenging air inside the channel simultaneously. In the second case (when the valve cylinders are placed in communication with the oil outlet in the distributor) both valves are closed by their springs 12'' and 14'. The admission of both scavenging air and water then ceases. In this manner the result is obtained that during a quite definite time interval within the working cycle of the explosion chamber the scavenging air valve and water-spray valve are opened, but otherwise are closed. In exactly similar manner, the nozzle valve 13 is provided with a similar piston and return spring and connected to another section of the distributor by a pipe 25, so that this valve too is opened during a wholly definite, but different, time interval within the working cycle of the explosion chamber, but otherwise is closed.

The gas or fuel valve 11 is likewise operated from the distributor to which it is connected by a pipe 26. As shown in Fig. 4 the pipes leading from the distributor to the valves of an explosion chamber, such as the pipes 25 and 26, and the pipe 27 (the latter common to both branches 19', 19') may be connected to the distributor along a generatrix, i. e. along a line on the surface of the distributor parallel to the axis of the distributor, as shown also in my Patent No. 877,194; the other sets of pipes, indicated for example at 30, entering the distributor at equally spaced intervals, as shown in Fig. 5, also along lines parallel to the axis of the distributor, and being employed to operate the other explosion chambers associated with the turbine rotor 17. It will be understood that the timing of the opening and closing of the valves will be determined by the circumferential position and the circumferential extent of the oil pressure channel 22' and the relief outlet 23 associated with each of the pipes 25, 26, and 27. The lengths and relative angular positions of these oil pressure and relief outlets for each of the valves of a combustion turbine are clearly indicated in Fig. 3 which contains all the information necessary for the proper design of the distributor. Fig. 3 illustrates the pressure conditions in the explosion chamber during a complete cycle. The curve shown in the dotted lines and corresponding to the period $a$ relates to the nozzle valve 13; the curve shown in the dotted lines and corresponding to the period relates to the valve 12, and the curve shown in the dotted lines and corresponding to the period $c$ relates to the fuel in the valve 11. That is, the outlet valve or nozzle valve 13 is open during the period $a$, the scavenging valve 12 is open during the period $b$, and the fuel valve 11 is open during the period $c$. Of course, the valve of the jet 14 is also open during the period $b$, since said valve is operated in synchronism with the scavenging valve 12. It will be seen that the period $b$ overextends period $a$ slightly toward the end, thus indicating that during the period $d$ the nozzle valve 13 will be closed at a time when the scavenging valve 12 and the valve of the water jet 14 are still open to a certain extent. Fig. 2 shows the position of the valve 13 and of the valve of the jet 14 at that time, it being understood that the position of the valve 12 would be the same as in Fig. 1. Fig. 2 also shows a slightly different construction of the water jet which, in this case, has its nozzle or outlet projected into the channel 15, whereas in Fig. 1 the outlet for the water is formed by a perforated plate located at one side of the channel 15 and cooperating with a needle valve. The water supplied to the jet 14 in Fig. 1 under a pressure of several atmospheres, is atomized or sprayed by the perforated plate. In Fig. 2, the air streaming past and around the perforated outlet of the jet device 14$^a$ exerts a suction and also blows upon the fine jets of water and thus breaks them up or atomizes them. It will be understood that during the short period $d$, water will be injected into the channel 15 while the communication between said channel and the combustion chamber has been interrupted by the closing of the valve 13. This injection of water at a time when no blast is passing through the channel 15 insures a very thorough cooling of the channel and of the outlet or nozzle valve 13.

While both Figs. 1 and 2 show the water jet arranged between the valve 13 and the nozzle 16, I do not wish to restrict myself to this specific arrangement.

Various changes in the specific form shown and described may be made within the scope of the claims without departing from the spirit of my invention.

I claim:

1. In a turbine, a combustion chamber having an inlet for scavenging air and an outlet for combustion gases, a turbine wheel, nozzles in operative relation to said wheel, a channel connecting said nozzles with said outlet, a valve controlling said inlet, another valve controlling said outlet, and a jet means for injecting a cooling liquid into the stream of scavenging air at a point adjacent to said outlet valve.

2. In a turbine, a combustion chamber having an inlet for scavenging air and an outlet for combustion gases, a turbine wheel, nozzles in operative relation to said wheel, a channel connecting said nozzles with said outlet, a valve controlling said inlet, another valve controlling said outlet, and a jet means for injecting a cooling liquid into the stream of scavenging air at a point adjacent to said outlet valve so that the cooling liquid will strike said valve as well as come in contact with the stream of scavenging air.

3. In a turbine, a combustion chamber having an inlet for scavenging air and an outlet for combustion gases, a turbine wheel, nozzles in operative relation to said wheel, a channel connecting said nozzles with said outlet, a valve controlling said inlet, another valve controlling said outlet, a jet means for injecting a cooling liquid into the stream of scavenging air at a point adjacent to said outlet valve, and a controlling device for opening both the scavenging valve and said jet means simultaneously.

4. In a turbine, a combustion chamber having an inlet for scavenging air and an outlet for combustion gases, a turbine wheel, nozzles in operative relation to said wheel, a channel connecting said nozzles with said outlet, a valve controlling said inlet, another valve controlling said outlet, a jet means for injecting a cooling liquid into the stream of scavenging air at a point adjacent to said outlet valve, and a unitary pressure device for opening both the scavenging valve and said jet.

5. In a turbine, a combustion chamber having an inlet for scavenging air and an outlet for combustion gases, a turbine wheel, nozzles in operative relation to said wheel, a channel connecting said nozzles with said outlet, a valve controlling said inlet, another valve controlling said outlet, and a jet means within said channel for injecting a cooling liquid into the stream of scavenging air between said outlet valve and said nozzles.

In testimony whereof I have hereunto set my hand.

HANS HOLZWARTH.